No. 892,608. PATENTED JULY 7, 1908.
W. MORRISON.
ELECTRIC BATTERY.
APPLICATION FILED AUG. 11, 1902.

Witnesses:—
JB Weir
Harry P. Baumgartner

Inventor:
William Morrison
By Chas. C. Buckley
Atty.

UNITED STATES PATENT OFFICE.

WILLIAM MORRISON, OF CHICAGO, ILLINOIS, ASSIGNOR TO GEORGE RUMRILL CORYELL, OF CHICAGO, ILLINOIS.

ELECTRIC BATTERY.

No. 892,608. Specification of Letters Patent. Patented July 7, 1908.

Application filed August 11, 1902. Serial No. 119,204.

*To all whom it may concern:*

Be it known that I, WILLIAM MORRISON, a citizen of the United States of America, and resident of Chicago, Cook county, Illinois, have invented a certain new and useful Improvement in Electric Batteries, of which the following is a specification.

My invention relates to an improvement in a type of battery in which bromin is employed and which is described and claimed in an application filed concurrently herewith, No. 119,205, and hereinafter referred to, the essential feature of which consists in a negative element so disposed as that liquid bromin placed or deposited thereupon tends to remain in position in virtue of gravity. In still another application filed concurrently herewith, No. 119,202, and hereinafter referred to, I have shown, described and claimed a containing cell adapted for use in connection with the bromin gravity battery, the material thereof being carbon which is practically unaffected by the attacks of the bromin and the bottom of which cell also provides a negative element upon which the liquid bromin is electro deposited or placed and upon which it tends to remain in virtue of gravity. In still another application filed concurrently herewith, and hereinafter referred to, No. 119,201, I have illustrated, described and claimed different means for maintaining the liquid bromin more stable upon the negative element.

In my present application I wish to illustrate, describe and claim another character of cell adapted for the employment of liquid bromin which is electro deposited or placed upon a negative element disposed so that gravity will tend to cause the liquid bromin to remain distributed upon or throughout the negative element.

My invention primarily consists in the employment of a containing cell of a material adapted to withstand the attacks of the liquid bromin which material may be glass, porcelain or the like, and within the said containing cell I dispose a negative element adapted to receive the liquid bromin, electro deposited or placed thereon and which tends to remain thereon in virtue of gravity.

Figure 1:
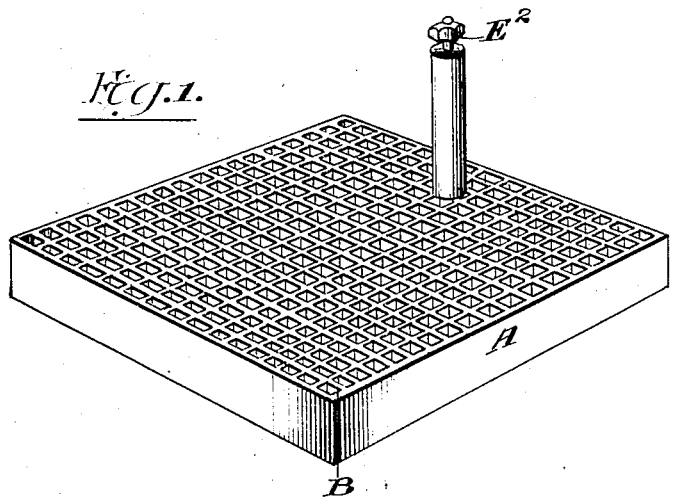
Figure 2:
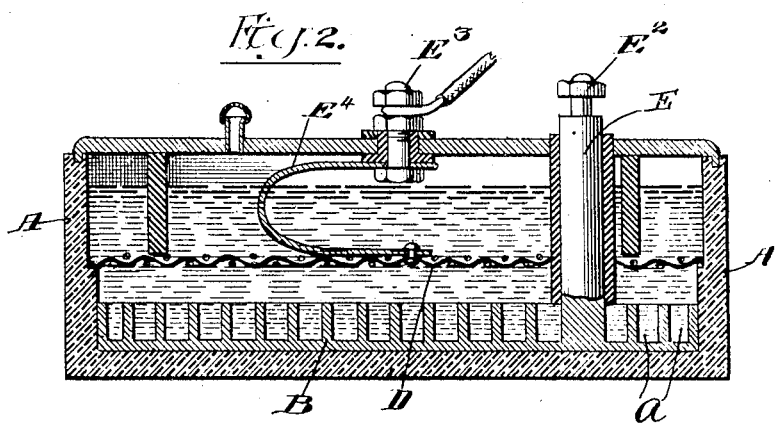
Figure 3:
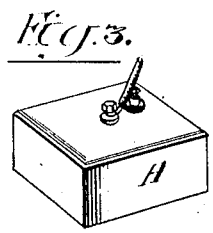

Reference may now be had to the accompanying drawings in which:

Figure 1, is a perspective view of a negative element adapted to be disposed in the bottom of a containing cell. Fig. 2, is a central cross section view of a completed cell. Fig. 3, is an exterior perspective view of a completed cell.

The containing cell which is designated at A may be of glass or porcelain or other suitable material which is not injuriously affected by the bromin within it. Within the cell disposed at the bottom thereof is a negative element B which, as shown, is made up of a great multiplicity of pockets $a$ which are formed in or upon the negative element and which are adapted to receive and hold the liquid bromin electro deposited or placed upon the negative element, B. In this, my present application, I desire to claim as my invention an electric battery having a containing cell of a suitable material capable of withstanding the bromin attacks and having disposed in the bottom thereof a suitable negative element upon which the bromin is placed or electro deposited. The feature of the pockets or recesses $a$ has been embodied in another application filed concurrently herewith, and this feature together with another for holding the bromin in a more stable position is, as stated, embodied in a still further application filed concurrently herewith and I do not herein, therefore, claim the feature of the pockets or recesses. In this type of battery in which the containing cell is a non conductor it is unnecessary to employ an insulating band about the interior sides of the cell as is necessary or desirable in the case of the carbon cell as described in the application for that cell and therefore also the positive element D which can be of copper or other suitable material may be supported upon a shoulder or ridge $d$ formed on the interior of the sides of the cell. In the case of this battery also it is necessary to provide an interior conductor E insulated from the positive element D and extending from the negative element to the terminal $E^2$ on the exterior of the cell. The other terminal of the battery $E^3$ is connected in the usual way by means of a conductor $E^4$ which is secured to the positive element.

The serial numbers of my co-pending applications are as follows: 119,201, 119,202, 119,203, and 119,205.

Having thus described my invention, what I claim as new and desire to secure by Letters Patent is:

1. In a storage battery, the combination with a cell of non-conducting material, negative and positive elements, the negative element being imperforate, a deposit of bromin supported entirely by the negative element, and means for preventing the deposit of bromin from being displaced from its support.

2. In a storage battery, the combination with a cell of non-conducting material, of positive and negative elements, and means for preventing the lateral displacement of bromin electrolytically deposited on the upper surface of a negative element.

3. A storage battery comprising a cell, a positive and negative element, a bromin electrolyte, the negative element being independent of the cell of the battery, but so disposed that it is below the upper surface or boundary of the bromin electrolytically deposited when the battery is charged.

Signed by me at Chicago, Cook county, Illinois, this 8th day of August 1902.

WILLIAM MORRISON.

Witnesses:
CHAS. C. BULKLEY,
HARRY P. BAUMGARTNER.